(12) United States Patent
Lee et al.

(10) Patent No.: US 10,990,778 B2
(45) Date of Patent: Apr. 27, 2021

(54) APPARATUS AND METHOD FOR RECOGNIZING BARCODE BASED ON IMAGE DETECTION

(71) Applicant: ELECTRONICS AND TELECOMMUNICATIONS RESEARCH INSTITUTE, Daejeon (KR)

(72) Inventors: Yong Kwi Lee, Daejeon (KR); Ji Yeon Son, Daejeon (KR); Hyun Kim, Daejeon (KR); Hyun Jong Kim, Cheongju-si (KR); Hark Jin Lee, Daejeon (KR); Young Ae Jeon, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 98 days.

(21) Appl. No.: 16/169,010

(22) Filed: Oct. 24, 2018

(65) Prior Publication Data
US 2019/0130151 A1   May 2, 2019

(30) Foreign Application Priority Data

Oct. 30, 2017 (KR) .......... 10-2017-0142723
Sep. 21, 2018 (KR) .......... 10-2018-0113905

(51) Int. Cl.
*G06K 7/14* (2006.01)
*G06T 7/13* (2017.01)
(Continued)

(52) U.S. Cl.
CPC ....... *G06K 7/1452* (2013.01); *G06K 7/10128* (2013.01); *G06K 7/10811* (2013.01);
(Continued)

(58) Field of Classification Search
CPC ........ G02B 7/36; G03F 9/7026; G03F 9/7029
See application file for complete search history.

(56) References Cited

U.S. PATENT DOCUMENTS 5,770,848 A * 6/1998 Oizumi .............. G06K 7/10831
235/383
6,431,447 B1   8/2002 Park et al.
(Continued)

FOREIGN PATENT DOCUMENTS

KR   10-2000-0009657 A   2/2000
KR   10-1612054 B1   4/2016
(Continued)

*Primary Examiner* — Joshua L Schwartz
(74) *Attorney, Agent, or Firm* — LRK Patent Law Firm

(57) ABSTRACT

A barcode recognition apparatus and a barcode recognition method. The barcode recognition method includes receiving, from a sensor, a triggering message indicating that a product enters, setting a camera focus on the basis of a barcode in an image of the product obtained using a camera upon receiving the triggering message, obtaining a product image according to the set camera focus, performing preprocessing for extracting a barcode region on the product image, extracting the barcode region from the preprocessed image, and deriving barcode information from the extracted barcode region.

14 Claims, 13 Drawing Sheets

(51) Int. Cl.
*G06T 5/00* (2006.01)
*G06K 7/10* (2006.01)
*G06K 9/62* (2006.01)

(52) U.S. Cl.
CPC ........... *G06K 7/146* (2013.01); *G06K 7/1478* (2013.01); *G06K 9/6202* (2013.01); *G06T 5/002* (2013.01); *G06T 5/003* (2013.01); *G06T 7/13* (2017.01); *G06T 2207/20032* (2013.01)

(56) References Cited

U.S. PATENT DOCUMENTS

| | | |
|---|---|---|
| 6,622,133 B1 | 9/2003 | Park et al. |
| 7,303,131 B2 | 12/2007 | Carlson et al. |
| 2005/0006477 A1* | 1/2005 | Patel .................. G06K 7/10811 235/462.24 |
| 2007/0187571 A1* | 8/2007 | Ebe .......................... G02B 7/36 250/201.2 |
| 2011/0235934 A1* | 9/2011 | Takahashi ................ H04N 5/21 382/254 |
| 2013/0022289 A1* | 1/2013 | Umeda .................. G06T 5/002 382/274 |

FOREIGN PATENT DOCUMENTS

| | | |
|---|---|---|
| KR | 10-1632380 B1 | 6/2016 |
| KR | 10-1748877 B1 | 6/2017 |

* cited by examiner

LABEL NUMBER GROUPING

APPARATUS AND METHOD FOR RECOGNIZING BARCODE BASED ON IMAGE DETECTION

CROSS REFERENCE TO RELATED APPLICATIONS

This application claims priority to Korean Patent Application No. 10-2017-0142723, filed Oct. 30, 2017, and Korean Patent Application No. 10-2018-0113905, filed Sep. 21, 2018, in the Korean Intellectual Property Office (KIPO), the entire contents of which are hereby incorporated by reference.

BACKGROUND

1. Technical Field

Example embodiments of the present invention relate to an apparatus and method for recognizing a barcode based on image detection, and more specifically, to an apparatus and method for recognizing a barcode on a product on a factory production line on the basis of an image.

2. Description of Related Art

There are several methods of transferring products on process lines in a factory. A method of transferring products between processes using a conveyor belt is most commonly used, and a method of transferring products by placing the products on a fixed frame in a Squid manner is also used. In addition, large-sized products may be transferred using a forklift or an automatic guided vehicle (AGV). As products are being diversified in recent years, a large number of process lines are required according to types of the products and the products are being produced with a production system for producing a small amount and multiple types of products.

In such an environment, an operator typically checks barcodes attached on parts using a hand-held barcode reading gun in order to identify each product. However, such repetitive work causes fatigue to the operator, and erroneous specification or erroneous assembly occurs often such that a barcode of product B is read even when parts of product A are actually assembled.

Therefore, there is a need for a barcode recognizing technique in which human factor errors and a process of transferring products may be checked at one time.

SUMMARY

Accordingly, example embodiments of the present invention are provided to substantially obviate one or more problems due to limitations and disadvantages of the related art.

Example embodiments of the present invention provide a method of recognizing a barcode on a product on a factory production line on the basis of an image.

Example embodiments of the present invention also provide a barcode recognizing apparatus using the method of recognizing the barcode.

In some example embodiments, a barcode recognition method includes receiving, from a sensor, a triggering message indicating that a product enters, setting a camera focus on the basis of a barcode in an image of the product obtained using a camera upon receiving the triggering message, obtaining a product image according to the set camera focus, performing preprocessing for extracting a barcode region on the product image, extracting the barcode region from the preprocessed image, and deriving barcode information from the extracted barcode region.

The setting of the camera focus on the basis of the barcode in the image of the product obtained using the camera may include extracting edges of the barcode with respect to a plurality of focuses at regular intervals within a search range which is set based on an initial focus and calculating a sum of values of pixels constituting each of the extracted edges, and setting the focus, at which the calculated sum of the values of the pixels of the edge is maximum, as the camera focus for obtaining a barcode image.

The setting of the camera focus on the basis of the barcode in the image of the product obtained using the camera may include comparing calculated sums of values of pixels of edges with respect to a plurality of camera focuses, and setting a focus, at which the sum of the values of the pixels of the edge is maximum, as the camera focus for obtaining a barcode image.

The comparing of the calculated sums of the values of the pixels of the edges with respect to the plurality of camera focuses may include setting a search range on the basis of an initial focus and extracting the edges of the barcode within the search range while decreasing or increasing a value of the focus to have a predetermined interval from an upper limit or a lower limit of the search range.

The extracting of the edges of the barcode while decreasing or increasing the value of the focus to have the predetermined interval from the upper limit or the lower limit of the search range may include calculating a sum of the values of the pixels of the edge at a first focus, calculating a sum of the values of the pixels of the edge at a second focus which is set at a time point following the point at which the first focus is set, and stopping additional extraction of the edge of the barcode for a next focus and setting the first focus as the camera focus for obtaining the barcode image when the sum of the pixel values of the edge calculated at the first focus is greater than or equal to the sum of the pixel values of the edge calculated at the second focus.

The performing of the preprocessing for extracting the barcode region on the product image may include performing image enhancement on the product image and extracting the barcode region from the enhanced product image.

The performing of the image enhancement on the product image on the image may include performing a sharpening operation by subtracting a blurred image from the product image, calculating a product of pixel values of the sharpened image, and removing noise generated due to the sharpening operation.

The extracting of the barcode region may include extracting a histogram of the image that is input, performing binarization on the image using the histogram of the image and an adaptive threshold, and performing a labeling operation on the binarized image.

The performing of the binarization on the image may include dividing the image into a plurality of sub-regions, assigning a threshold for each of the sub-regions according to brightness of a corresponding sub-region, and performing binarization for each of the sub-regions according to the corresponding threshold.

Here, each of the pixel values may be a value indicating a luminance of a corresponding pixel.

In other example embodiments, a barcode recognition apparatus includes at least one processor and a memory configured to store at least one instruction executed by the processor, wherein the at least one instruction includes an instruction for causing the processor to receive a triggering message which indicates that a product enters from a sensor, an instruction for causing the processor to set a camera focus on the basis of a barcode in an image of the product obtained using the camera upon receiving the triggering message, an instruction for causing the processor to obtain a product image according to the set camera focus, an instruction for causing the processor to perform preprocessing for extracting a barcode region on the product image, an instruction for causing the processor to extract the barcode region from the preprocessed image, and an instruction for causing the processor to derive barcode information from the extracted barcode region.

The instruction for causing the processor to set the camera focus on the basis of the barcode in the image of the product obtained using the camera may include an instruction for causing the processor to extract edges of the barcode with respect to a plurality of focuses at regular intervals within a search range which is set based on an initial focus and calculate a sum of values of pixels constituting each of the extracted edges and an instruction for causing the processor to set the focus, at which the calculated sum of the pixel values of the edge is maximum, as the camera focus for obtaining a barcode image.

The instruction for causing the processor to set the camera focus on the basis of the barcode in the image of the product obtained using the camera may include an instruction for causing the processor to compare the calculated sum of the pixel values of the edge with respect to a plurality of camera focuses and an instruction for causing the processor to set the focus, at which the sum of the pixel values of the edge is maximum, as the camera focus for obtaining the barcode image.

The instruction for causing the processor to compare the calculated sums of the pixel values of the edges with respect to the plurality of camera focuses may include an instruction for causing the processor to set the search range on the basis of the initial focus and an instruction for causing the processor to extract the edges of the barcode within the search range while decreasing or increasing a focus value to have a predetermined interval from an upper limit or a lower limit of the search range.

In this case, the instruction for causing the processor to extract the edges of the barcode within the search range while decreasing or increasing the focus value to have the predetermined interval from the upper limit or the lower limit of the search range may include an instruction for causing the processor to calculate a sum of the pixel values of the edge at a first focus, an instruction for causing the processor to calculate a sum of the pixel values of the edge at a second focus which is set at a time point following a time point at which the first focus is set, and an instruction for causing the processor to stop additional extraction of the edge of the barcode at a next focus and set the first focus as the camera focus for obtaining the barcode image when the sum of the pixel values of the edge calculated at the first focus is greater than or equal to the sum of the pixel values of the edge calculated at the second focus.

The instruction for causing the processor to perform the preprocessing for extracting the barcode region on the product image may include an instruction for causing the processor to perform image enhancement on the product image and an instruction for causing the processor to extract the barcode region from the enhanced product image.

The instruction for causing the processor to perform the image enhancement on the product image may include an instruction for causing the processor to perform a sharpening operation by subtracting a blurred image from the product image, an instruction for causing the processor to calculate a product of pixel values of the sharpened image, and an instruction for causing the processor to remove noise generated due to the sharpening operation.

The instruction for causing the processor to extract the barcode region may include an instruction for causing the processor to extract a histogram of the image that is input, an instruction for causing the processor to perform binarization on the image using the histogram of the image and an adaptive threshold, and an instruction causing the processor to perform a labeling operation on the binarized image.

The instruction for causing the processor to perform the binarization on the image may include an instruction for causing the processor to divide the image into a plurality of sub-regions, an instruction for causing the processor to assign a threshold for each of the sub-regions according to brightness of a corresponding sub-region, and an instruction for causing the processor to perform binarization for each of the sub-regions according to the corresponding threshold.

Here, each of the pixel values may be a value indicating a luminance of a corresponding pixel.

BRIEF DESCRIPTION OF DRAWINGS

Example embodiments of the present invention will become more apparent by describing example embodiments of the present invention in detail with reference to the accompanying drawings, in which.

DETAILED DESCRIPTION OF EXAMPLE EMBODIMENTS

Figure 1:
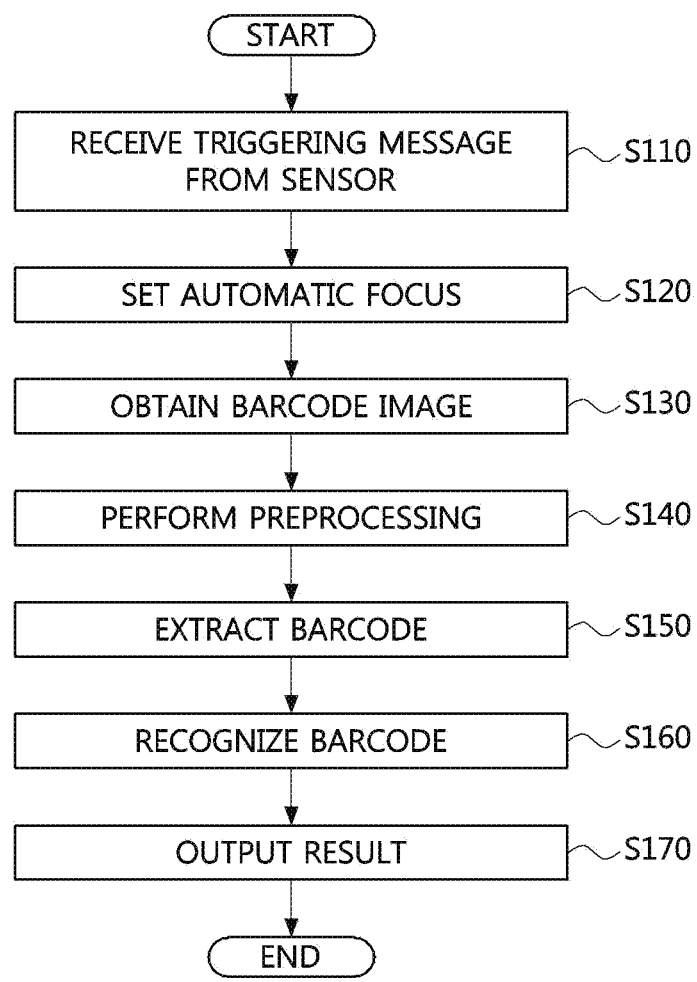
FIG. 1 is a flowchart schematically showing operations of an image-based remote barcode recognition method according to an embodiment of the present invention.

While the present invention may be modified in various ways and take on various alternative forms, examples of specific embodiments thereof are shown in the accompanying drawings and described in detail below. There is no intent to limit the example embodiments of the present invention to the particular forms disclosed. On the contrary, the present invention is to cover all modifications, equivalents, and alternatives falling within the spirit and scope of the present invention. Like numbers refer to like elements throughout the description of the figures.

It will be understood that, although the terms first, second, etc. may be used herein to describe various elements, these elements should not be limited to these terms. These terms are only used to distinguish one element from another element. For example, a first element could be termed a second element, and, similarly, a second element could be termed a first element, without departing from the scope of the present invention. As used herein, the term "and/or" includes any one or combinations of the associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present invention. As used herein, the singular forms "a," "an," and "the" are intended to include the plural forms as well, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms (including technical and scientific terms) used herein have the same meaning as commonly understood by one of ordinary skill in the art to which the present invention belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

When production with various models occurs inside a factory, a barcode recognition apparatus needs to operate to correspond to the various models of a product. In order to cope with each of the models, the barcode recognition apparatus also needs to check and track how the product changes. In the present invention, an apparatus and method for recognizing a barcode using an image allowing the barcode to be remotely recognized are provided instead of an existing hand-held barcode reader which is used for checking and tracking a product.

In particular, the present invention is focused on reducing a time required for barcode recognition. To this end, methods are proposed for zooming-in and zooming-out, automatic focusing, and accelerated processing to enable barcode recognition during a short period of time for which a product moves.

Hereinafter, exemplary embodiments of the present invention will be described in detail with reference to the accompanying drawings.

FIG. 1 is a flowchart schematically showing operations of an image-based remote barcode recognition method according to an embodiment of the present invention.

In the embodiment of FIG. 1, each of the operations of the barcode recognition method performed by a barcode recognition apparatus according to the embodiment of the present invention when a product is transferred using an automatic guided vehicle (AGV) on a transfer line will be described. A process line to which the embodiment of FIG. 1 may be applied may be, for example, a door trimming process line in an automobile factory.

Referring to FIG. 1, the barcode recognition apparatus according to the embodiment of the present invention starts a barcode recognition procedure by receiving a triggering message, "AGV IN," from an infrared sensor (S110). Here, the infrared sensor may be provided anywhere on a workbench, for example, at a left inlet side of the workbench or an outlet side of the workbench.

The barcode recognition apparatus according to the present invention may communicate with an industrial Internet of things (IIoT) sensor module. The IIoT sensor module, which is positioned at an inlet side through which a product enters, may detect the entry of the product and transmit the message, "AGV IN," to the barcode recognition apparatus. Further, an IIoT sensor module, which is positioned at the outlet through which the product leaves a detection region, may detect the exit of the product and transmit a message, "AGV OUT," to the barcode recognition apparatus.

Here, the IIoT sensor module may include an infrared sensor, and the infrared sensor detects the entry and exit of the product to inform the barcode recognition apparatus thereof. Therefore, any type of sensor as well as the infrared sensor may be used as long as it can detect the entry and exit of the product.

In the present invention, a change of the product which is transferred in such a manner may be checked by the infrared sensor or the like.

When the barcode recognition apparatus receives the triggering message from the infrared sensor, the barcode recognition apparatus sets an automatic focus on a product image of a camera of the barcode recognition apparatus (S120) and obtains a barcode image in the product (S130).

To this end, in the barcode recognition method according to the embodiment of the present invention, focusing may be performed by automatically tuning the focus of the camera upon receiving the triggering message, "AGV IN," the barcode image may be obtained in a focused state, and the corresponding barcode may be continuously captured until preprocessing of the obtained image is completed.

In the barcode recognition method according to the embodiment of the present invention, the automatic zooming-in and zooming-out of the camera may be managed in order to perform the automatic focusing, and the best-focused image may be obtained by an operation of, for example, zooming-in five times and zooming-out five times according to a focal distance.

Preprocessing is performed on a still image (e.g., a snapshot image) obtained after setting the automatic focus (S140). Here, the preprocessing may include processing for image enhancement, barcode region extraction, brightness unbalance correction, and uneven barcode recognition.

In a barcode extraction operation (S150) after the preprocessing, start and end patterns of the barcode are recognized. More specifically, in the barcode extraction operation, raw-sampling is performed on the preprocessed image, and a position of the barcode is recognized by recognizing the start and end patterns of the barcode so that the barcode is extracted.

Codebook matching and verification are performed on the extracted barcode so that final barcode recognition is performed (S160). That is, in the barcode recognition operation, the extracted barcode matches a codebook to convert the barcode into a number, and the final barcode recognition is performed by verifying the converted barcode number.

A finally recognized result is displayed through a user interface (S170).

Additionally, when all the capturing, recognition, and outputting for the corresponding product are completed and the corresponding product is then transferred and exits, the infrared sensor recognizes the product and transmits a message, "AGV OUT," to the barcode recognition apparatus according to the present invention, and the barcode recognition apparatus, which receives the corresponding message and recognizes the exit of the product, stops the capturing of the product and waits until a next product enters.

The present invention is characterized in that a time required for automatic focusing is significantly reduced using the automatic focus setting method in long distance barcode recognition and thus the barcode is quickly recognized. A general camera application programming interface (API) also has an automatic focus setting function, but it typically takes about two to five seconds to set automatic focus, including fine tuning.

According to an automatic focus setting method proposed in a first embodiment of the present invention, a time required for automatic focus setting, including fine tuning, is about 1.5 seconds. Further, according to an automatic focus setting method of a second embodiment of the present invention, which will be described below, a time required for automatic focus setting, including fine tuning, is only 750 ms to 900 ms, and thus a very short focus setting time may be obtained in comparison to an automatic focus setting time which can be expected from an existing general camera API.

Figure 2:
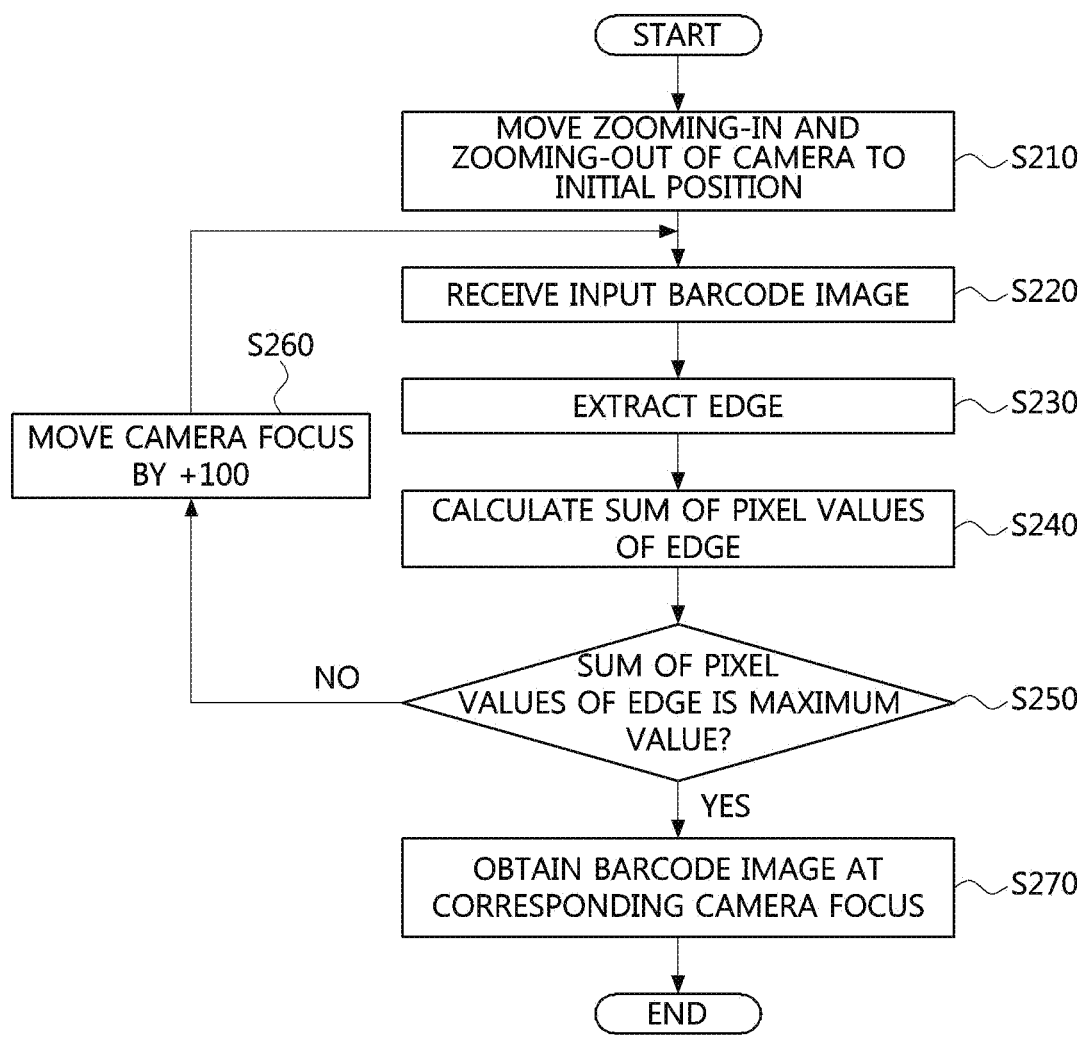
FIG. 2 is a flowchart showing operations of an automatic focus setting method according to a first embodiment of the present invention.

FIG. 2 is a flowchart showing operations of the automatic focus setting method according to the first embodiment of the present invention.

Referring to FIG. 2, in the automatic focus setting method according to the first embodiment, first, the barcode recognition apparatus moves the zooming-in and zooming-out of the camera to an initial position (S210) and checks an input barcode image (S220). The barcode recognition apparatus extracts an edge of a barcode from the input image (S230) and calculates a sum of pixel values of the edge (S240). Here, each of the pixel values may be a value indicating a luminance of a corresponding pixel.

It is determined whether the calculated sum of the pixel values of the edge is a maximum value (S250). When it is determined that the sum of the pixel values of the edge is not the maximum value, a camera focus is moved by being increased by 100 units in order to find a focus with the maximum value (S260), and the above operations 220 to 240 are repeated. When it is determined that the sum of the pixel values of the edge is the maximum value, the barcode recognition apparatus obtains a barcode image at a corresponding camera focus (S270) and transfers the image to a subsequent preprocessing procedure. Here, the maximum value may be a value which is set in advance by an experiment.

When the maximum value is not set in advance, the procedure of the method according to the first embodiment described in FIG. 2 may be modified to a procedure of extracting an edge at each of a plurality of camera focuses which are set within a predetermined search range, calculating a sum of pixel values of the edge, and obtaining a barcode image at a focus with a maximum value of the calculated values.

Figure 3:
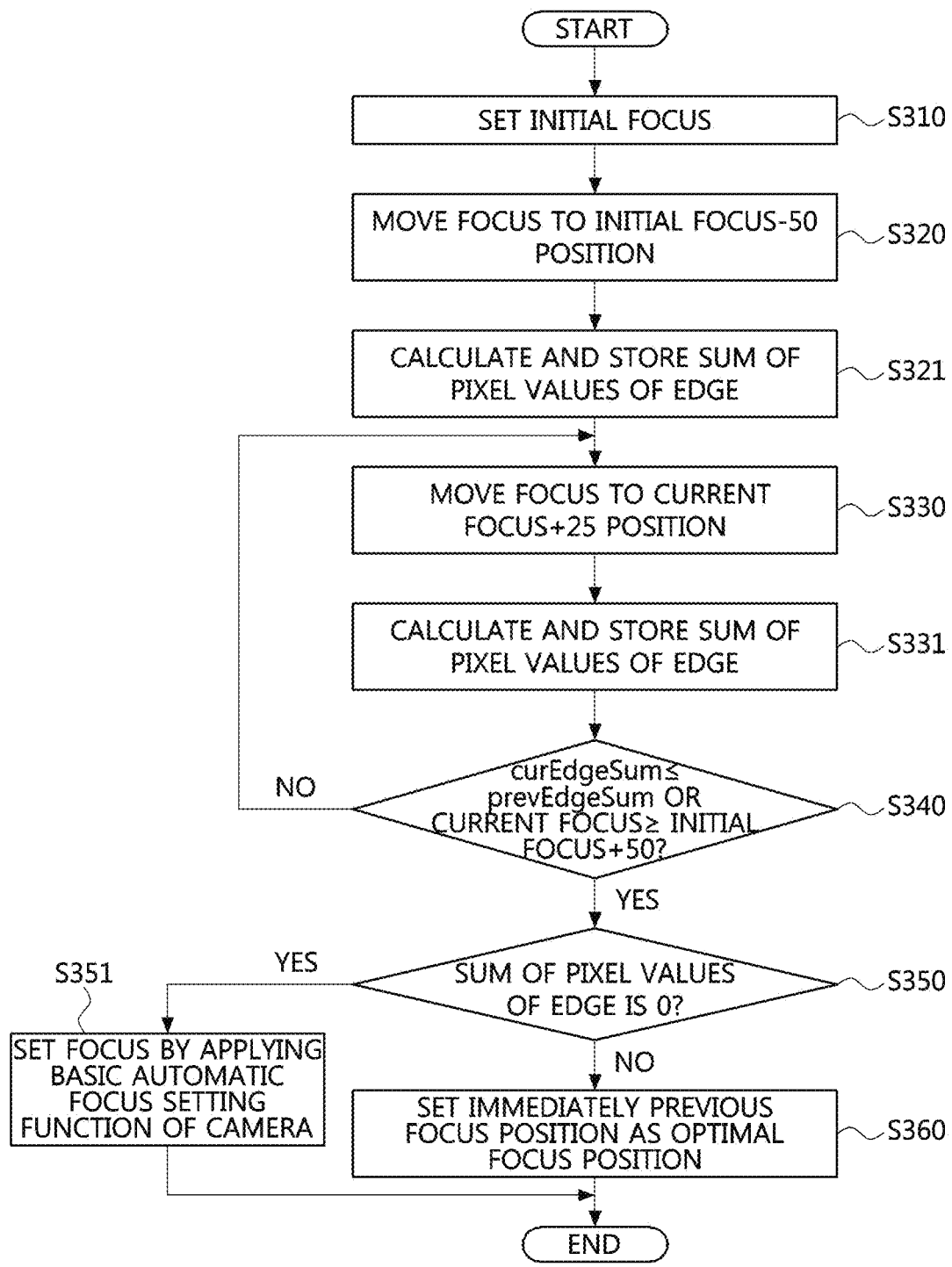
FIG. 3 is a flowchart showing operations of the automatic focus setting method according to a second embodiment of the present invention.

FIG. 3 is a flowchart showing operations of the automatic focus setting method according to the second embodiment of the present invention.

In the automatic focus setting method according to the second embodiment of the present invention, unlike the method according to the first embodiment described in FIG. 2, a search range is set based on an initial focus, and an edge of a barcode is extracted within the search range while decreasing or increasing a focus value from an upper or lower limit of the search range to have a predetermined interval. When a calculated sum of pixel values of the edge at a previous focus is greater than or equal to a calculated sum of pixel values of the edge at a current focus, additional extraction of the edge of the barcode at a next focus is stopped and the previous focus is set as a camera focus for obtaining a barcode image.

Specifically, in the second embodiment of FIG. 3, the search range is set to ±50 of a value of the initial focus, and the focus is moved by 25 per step and is determined at a position close to an optimal focus.

Referring to FIG. 3, for example, a value at an initial focus position, that is, the value of the initial focus, is set to a value of the current focus (S310) and searching for the optimal focus starts. That is, the focus is moved from an initial position to a position of "initPos-50," which is a lower boundary value of the search (S320), and a sum (curEdgeSum) of pixel values of the edge is calculated and stored (S321). The focus is then moved to a position of +25 of a corresponding time point, that is, "initPos+25" (S330), and the sum of the pixel values of the edge is calculated and stored (S331).

The sum of the pixel values of the edge is then calculated and stored while moving the position of the focus by +25. A sum of pixel values of the edge, which is calculated at a previous position everytime the focus position moves by one step, 25, is stored as a previous sum (prevEdgeSum) of the pixel values of the edge.

Meanwhile, when the previous sum (prevEdgeSum) of the pixel values of the edge is greater than or equal to the current sum (curEdgeSum) of the pixel values of the edge or when the position of the current focus is out of the search range, that is, "curPos≥initPos+50," the searching is stopped (i.e., YES in S340).

The reason for stopping the searching when the current sum (curEdgeSum) of the pixel values of the edge is greater than the previous sum (prevEdgeSum) of the pixel values of the edge, is that there is no need to additionally perform the search because the sum of the pixel values of the edge at a position, at which the sum of the pixel values of the edge is a maximum value, is moved by one step is smaller than the sum of the pixel values of the edge at a previous position. Therefore, in this case, the immediately preceding focus position is set as an optimal focus position (S360), and the focus setting procedure may be completed.

When the above-described method is used, it is possible to derive the optimal focus for barcode recognizing without scanning all of the entire range which is set as the search range, that is, "the initial position±50," thereby obtaining an effect of increasing a search speed.

Additionally, the case in which the camera focus is out of the range of "the initial position±50," may be the case in which the camera focus is out of the search range and the sum of the pixel values of the edge is zero (i.e., YES in S350). In this case, the focus may be set by applying an automatic focus setting function basically provided in a camera API (S351).

Here, the sum of the pixel values of the edge may refer to a value obtained by summing pixel values between 200 and 255 in the edge image extraction result. Further, for example, a Sobel edge detector may be used for the edge extraction.

Meanwhile, in the second embodiment of FIG. 3, for convenience of description, the sums of the pixel values of the edge are calculated and compared with each other while starting from a set lower limit of the search range and increasing the focus value. However, an embodiment in which sums of the pixel values of the edge are calculated and compared with each other while starting an upper limit of the search range and decreasing the focus value may also be included in the scope of the present invention.

Figure 4:
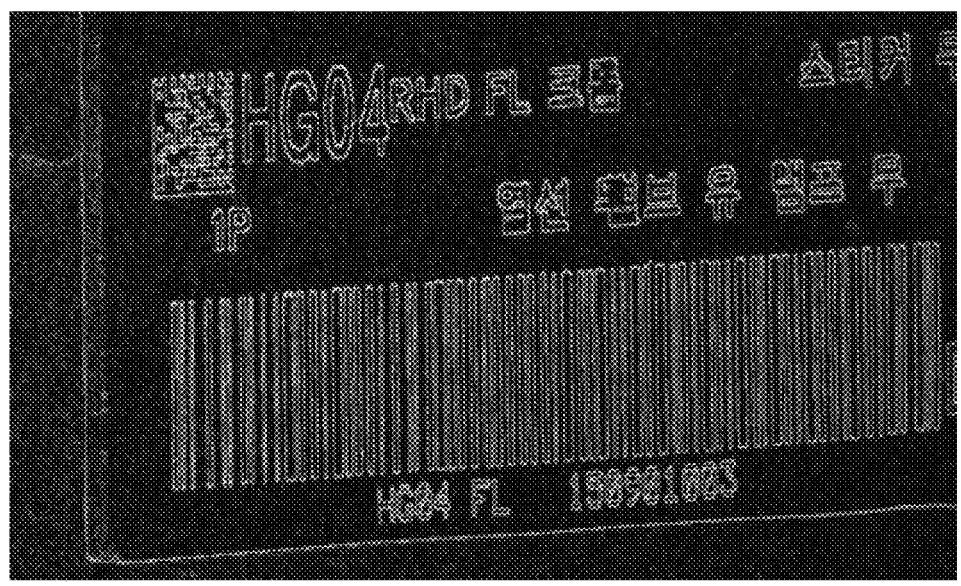
FIG. 4 shows an example of a result obtained by extracting an edge using the automatic focus setting method according to the second embodiment of the present invention.

FIG. 4 shows an example of a result obtained by extracting an edge using the automatic focus setting method according to the second embodiment of the present invention. FIG. 4 shows an edge image extracted using a Sobel filter.

Figure 5:
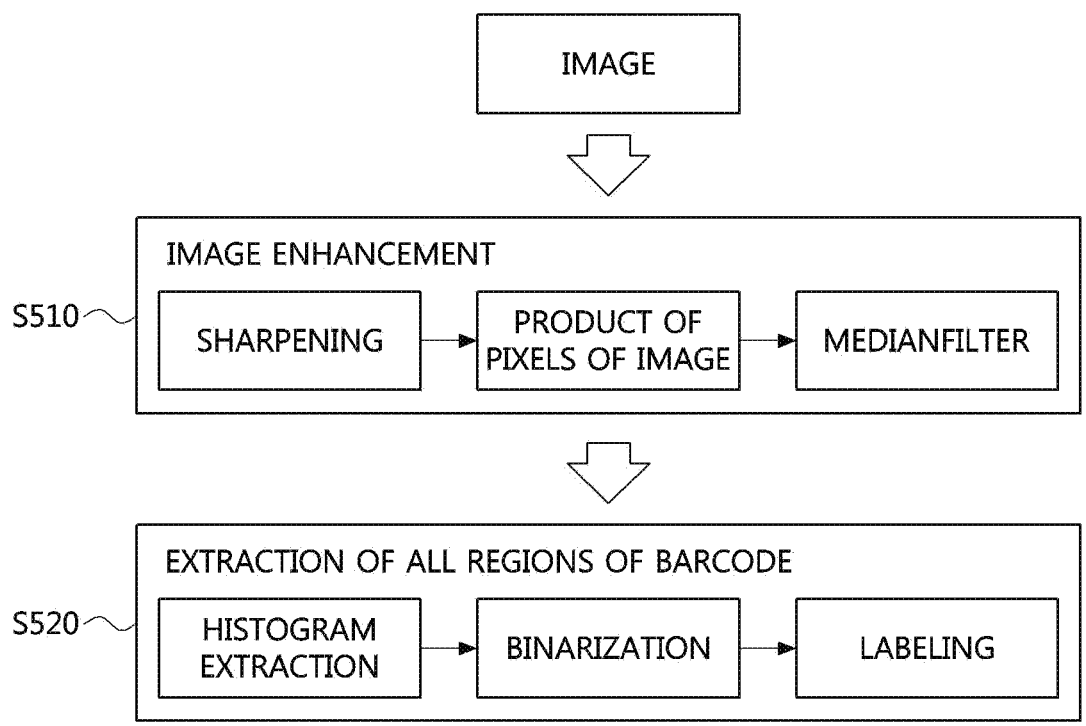
FIG. 5 is a flowchart showing operations of a preprocessing procedure according to an embodiment of the present invention.

FIG. 5 is a flowchart showing operations of a preprocessing procedure according to an embodiment of the present invention.

The preprocessing procedure according to the embodiment of the present invention is a process of correcting or improving an image when the image is dark or distorted in order to improve barcode recognition performance.

Referring to FIG. 5, the preprocessing procedure may include an image enhancement operation (S510) and an operation of extracting all regions of the barcode (S520).

The image enhancement operation (S510) may include, in detail, a sharpening operation, an operation of calculating a product of pixel values of an image, and an operation of applying a median filter.

The operation of extracting all regions of the barcode (S520) may include a histogram extraction operation, a binarization operation, and a labeling operation, for processing a highlighted part of an image.

Figure 6:
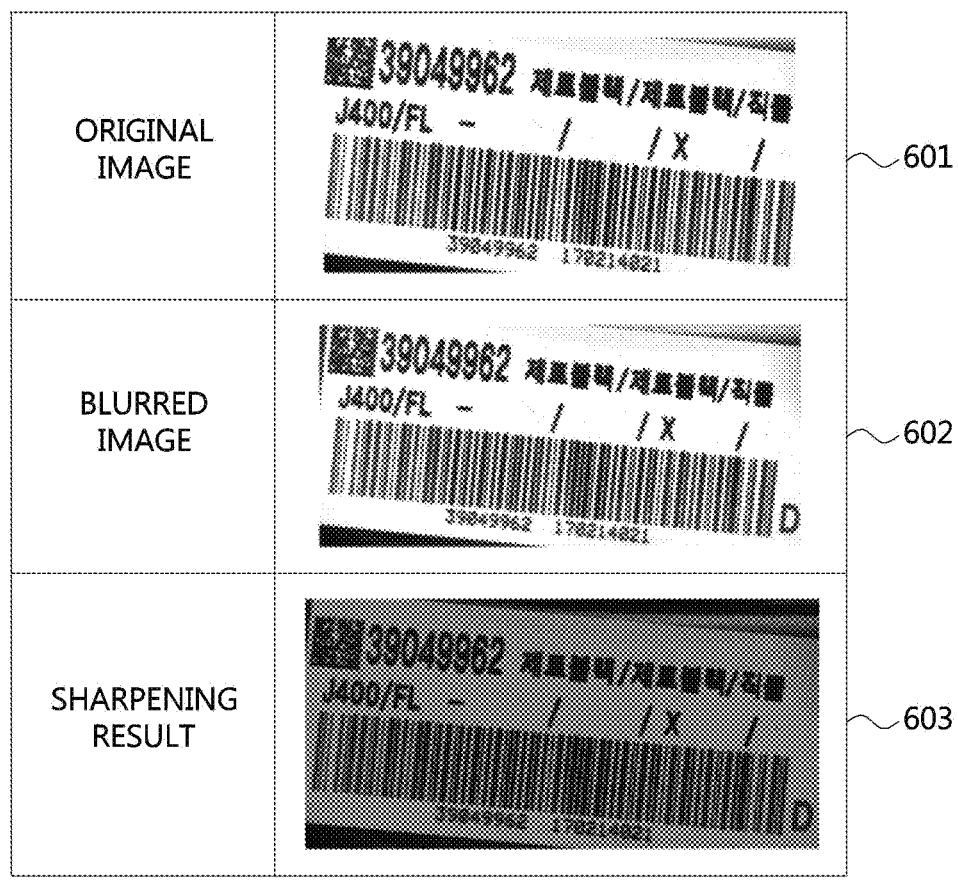
FIG. 6 shows an example of a resultant image obtained by performing a sharpening operation according to an embodiment of the present invention.

FIG. 6 shows an example of a resultant image obtained by performing a sharpening operation according to an embodiment of the present invention.

The sharpening operation may be used for sharpening an image or for detecting an edge of the image. The sharpening operation may be performed by, for example, generating a blurred image from an original image and subtracting the generated blurred image from the original image. In this method, an effect of removing a blurred portion from the original image may be expected. Therefore, the sharpened image has a clearer quality than the original image. Such an effect can be confirmed through an original image 601, a blurred image 602, and a sharpened image 603 in which a blurred portion is removed, which are shown in FIG. 6.

Figure 7:
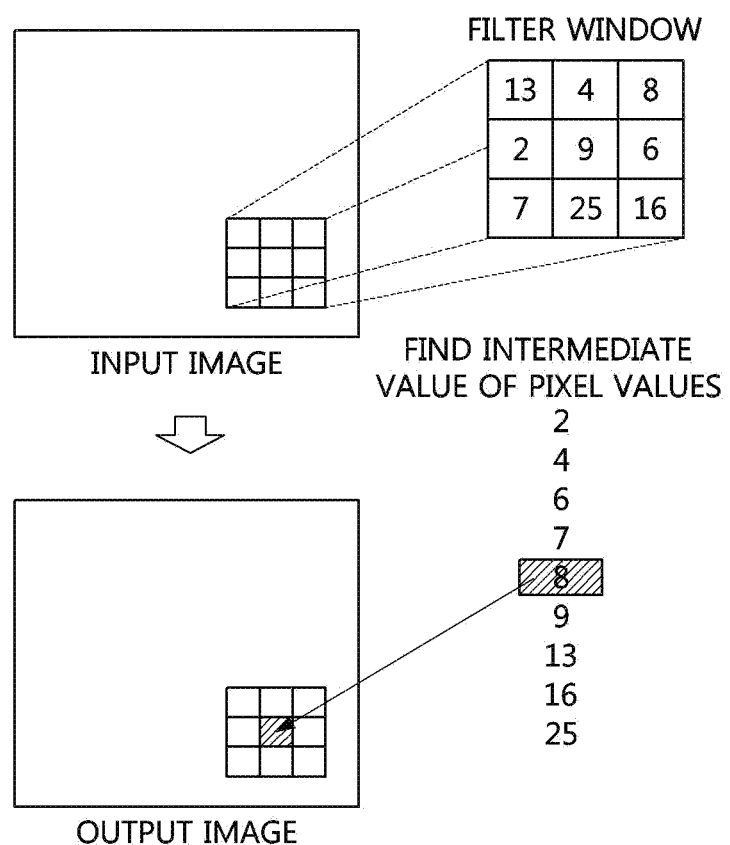
FIG. 7 is a view showing a concept of a median filter applied to the present invention.

FIG. 7 is a view showing a concept of a median filter applied to the present invention.

The median filter is a nonlinear digital filter which is often used for removing signal noise from an image or other signals. Typically, the median filter is used for performing high-performance noise removal of an image prior to performing high-level processing such as contour detection in image processing.

Referring to FIG. 7, the median filter applies a filter window to an input image and provides an intermediate value of pixel values of the input image to an output image. As described above, the median filter may be used for removing impulsive noise with a sharp color change, for example, as a spark, and may have an advantage in that a blurring phenomenon occurs less and maintains a boundary of an object well as compared with a linear spatial filtering method using a conventional average filter.

Figure 8:
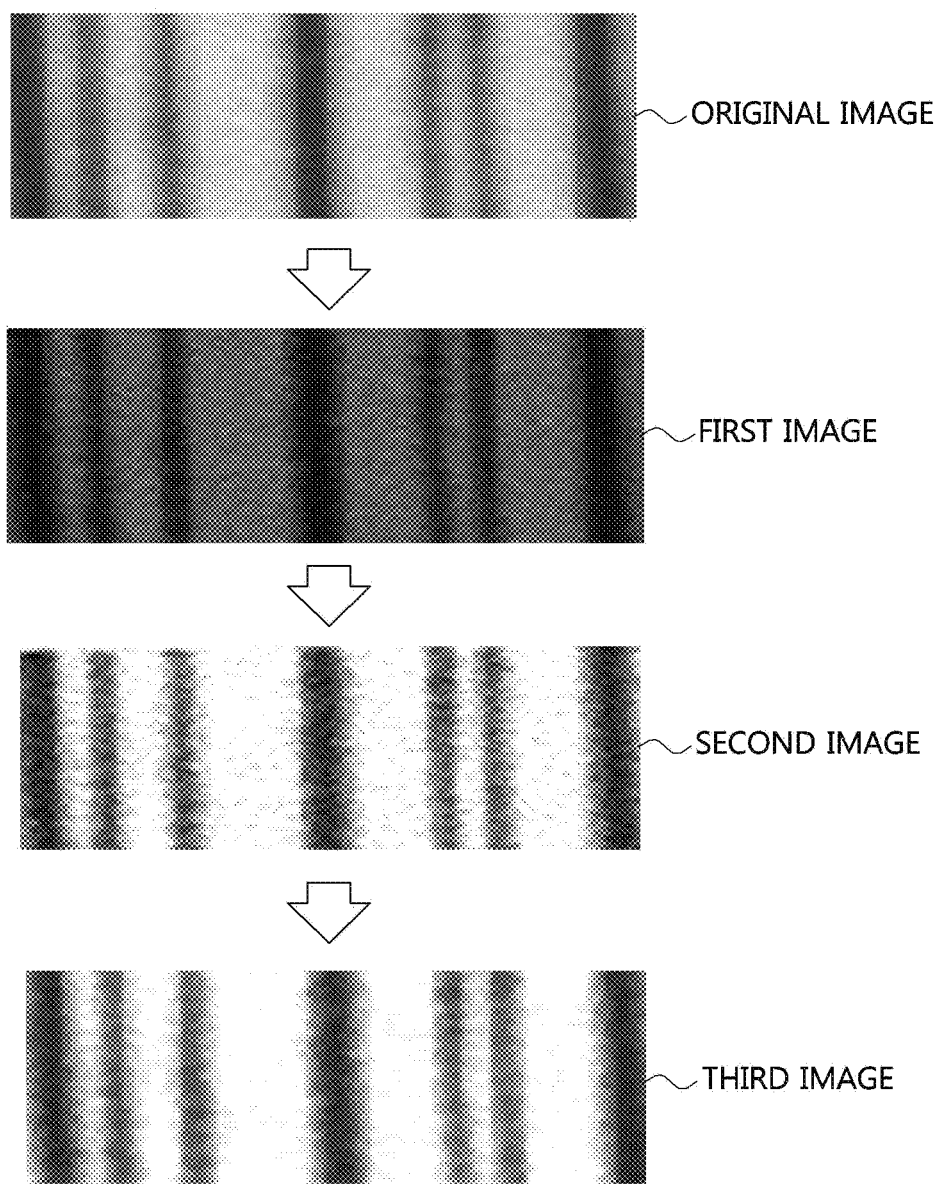
FIG. 8 is a view sequentially showing images for each operation of an image enhancement method for expanding a focus range according to the present invention.

FIG. 8 is a view sequentially showing images for each operation of an image enhancement method for expanding a focus range according to the present invention.

The image enhancement method is the same as that described with reference to FIG. 5, which may include, in detail, a sharpening operation, an operation of calculating a product of pixel values of an image, and an operation of applying a median filter.

An original image is shown at a top of FIG. 8, and an image after completing the sharpening operation for the original image is shown as a first image. Thereafter, an image obtained by calculating a product of pixel values of the image is shown as a second image. Referring to FIG. 8, a difference between a barcode region and a background is evident due to the product of the pixel values of the image. Thereafter, a resultant image obtained by removing noise which is caused by the sharpening operation by applying the median filter is shown as a third image of FIG. 8.

Figure 9:
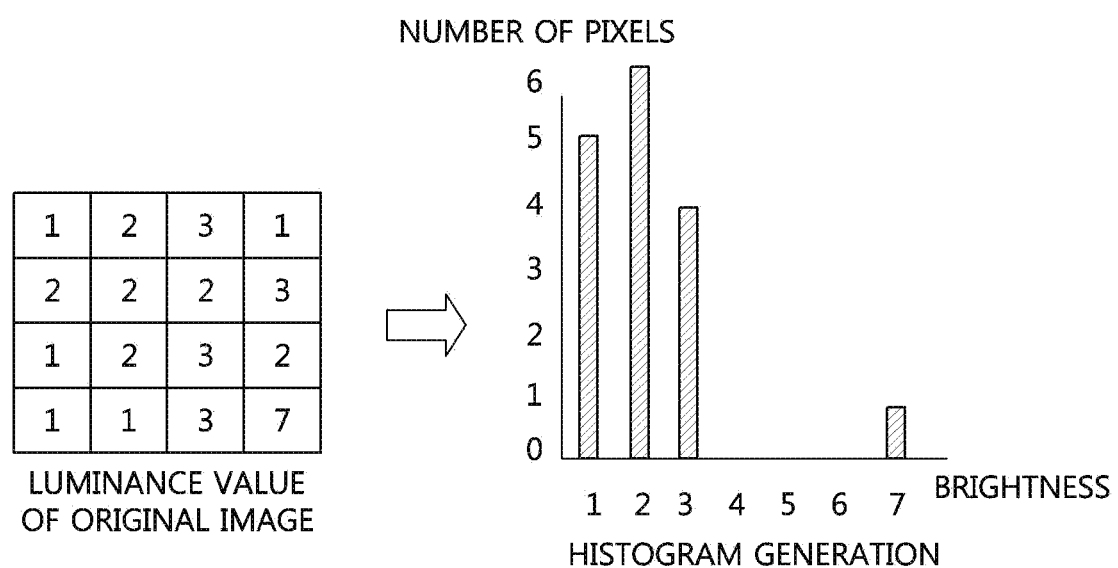
FIG. 9 is a view showing a concept of an image histogram that is applicable to the present invention.

FIG. 9 is a view showing a concept of an image histogram that is applicable to the present invention.

Referring to FIG. 9, the image histogram is a graph in which a brightness value of the image is shown as a horizontal axis and a frequency, indicating the number of pixels in the image having a size corresponding to the brightness value, is shown as a vertical axis. That is, the image histogram is a graph showing luminance values of the pixels of the image.

Figure 10:
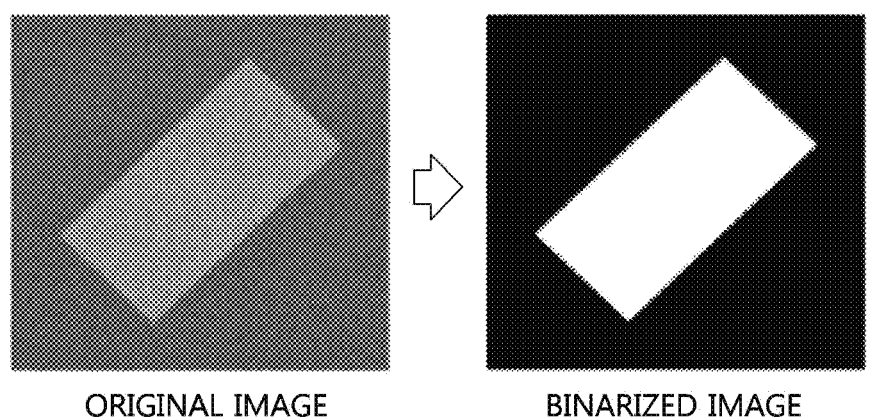
FIG. 10 is a view showing a concept of binarization that is applicable to the present invention.

FIG. 10 is a view showing a concept of binarization that is applicable to the present invention.

The binarization is that a color value of an image is expressed only with values of zero and one. Actually, a red, green, and blue (RGB) color image is converted into a monochrome image, and then a value of a corresponding pixel is converted into 255 and a value less than a threshold value is converted into 0 when the value of the corresponding pixel is greater than the threshold value on the basis of a specific threshold value.

Referring to FIG. 10, an original image including two gray regions having different pixel values is subjected to binarization processing so that a result expressed by black (255) or white (0) may be confirmed.

Figure 11A:
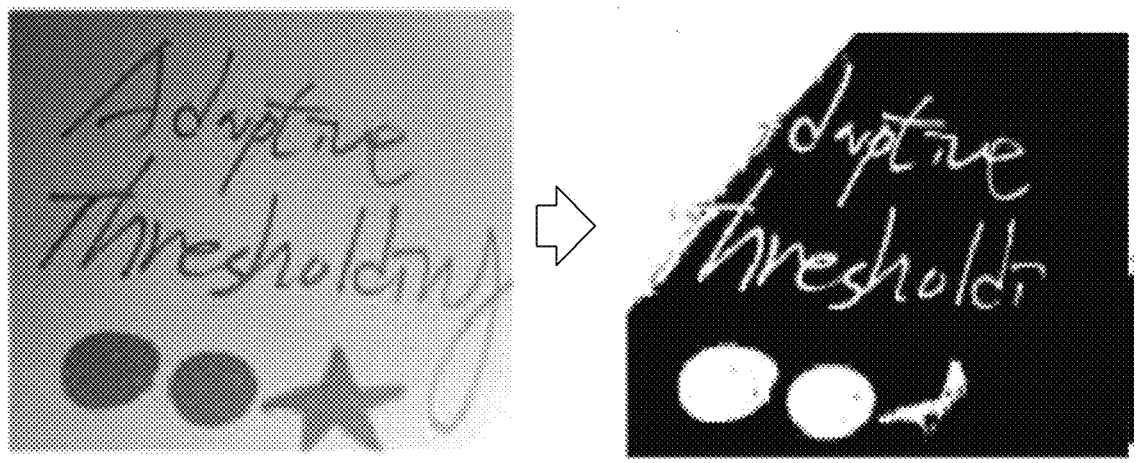
FIG. 11A is a view showing a resultant image for comparing an original image in the case in which a general binarization method is used.
Figure 11B:
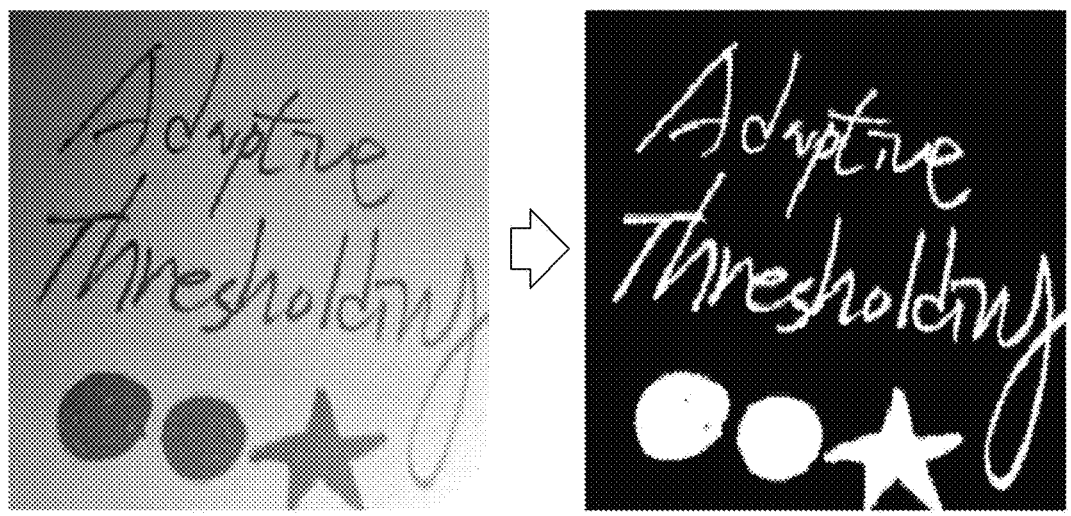
FIG. 11B is a view showing a resultant image for comparing an original image in the case in which a binarization method using an adaptive threshold applied to the present invention is used.

FIG. 11A is a view showing a resultant image for comparing an original image in the case in which a general binarization method is used, and FIG. 11B is a view showing a resultant image for comparing an original image in the case in which a binarization method using an adaptive threshold applied to the present invention is used.

A method of applying an adaptive threshold when binarization is performed according to the embodiment of the present invention is a method of performing binarization by dividing an image into multiple sub-regions having the same size and setting a threshold for each sub-region. That is, the method of applying the adaptive threshold when the binarization is performed is a method of adaptively applying, a threshold for each position of the sub-region of the image.

The reason for applying the adaptive threshold to perform the binarization is clearly revealed in an image including both sunny and shadowed places. In the sunny places, everything, is represented brightly so that a high threshold makes it possible to distinguish each other. Conversely, in the shadowed places, everything is represented darkly so that a threshold is preferably lowered relatively. Therefore, different thresholds are preferably set for each sub-region when the sub-region is separated into the sunny and shadowed places.

In this case, a method of applying an adaptive threshold of Open Source Computer Vision (OpenCV) may be used as one of the specific methods of applying the adaptive threshold. The above method is a method of using a difference between an average value of pixel values around a target pixel and a value of the corresponding pixel for thresholding. Specifically, when the difference between the average value of the pixel values around the target pixel and the value of the corresponding pixel is greater than zero, a result of the thresholding is set to 255, and otherwise, is set to 0. A range of pixels around the target pixel may be specified as, an argument of a function and may be set to a value such as 3, 5, 7, etc.

In FIG. 11A, in the case of the image to which the general binarization method is applied, a region occupying a substantial portion of an upper left corner is set to 0 so that the image after the application of the binarization is much different from the original image. On the other hand, in the case of the image which is output as a result of binarization using the adaptive threshold, as shown in FIG. 11B, it can be confirmed that letters and figures become more distinct than those in the original image.

FIGS. 12A to 12D are views for describing labeling that is applicable to the present invention.

Figure 12A:
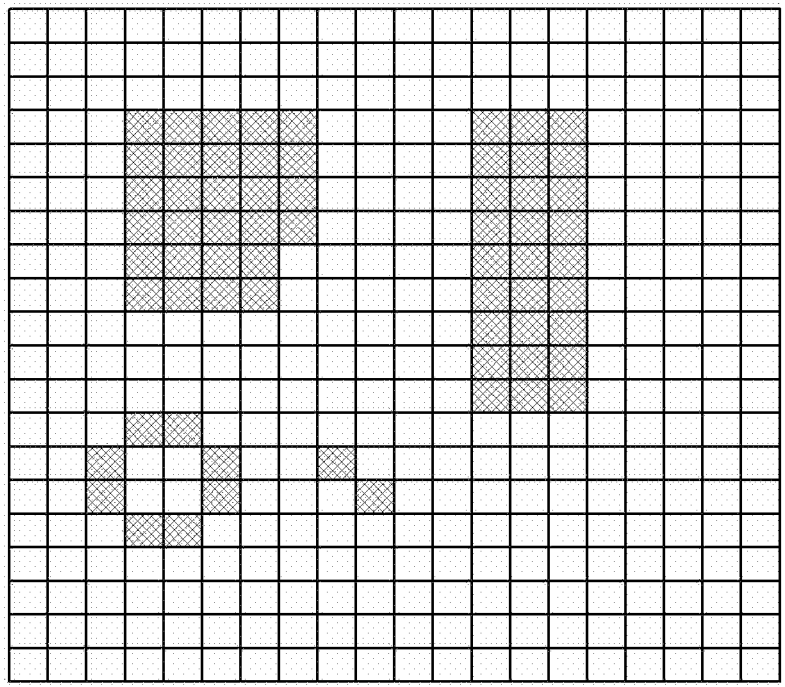
FIGS. 12A to 12D are views for describing labeling that is applicable to the present invention.

FIG. 12A shows a basic concept of the labeling. An image shown in FIG. 12A is a binarized image, and grouping of adjacent regions when each pixel has a value of 0 or 255 (1-channel) is referred to as labeling.

Figure 12B:
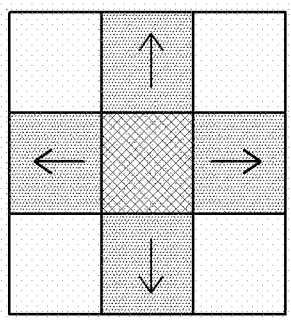
Figure 12C:
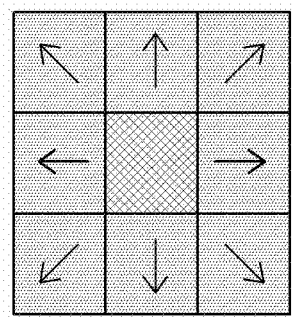

FIG. 12B shows a 4-neighbor method for searching for four neighboring pixels positioned in four directions, that is, upward, downward, leftward, and rightward directions, with respect to a current pixel when searching for pixels adjacent to the current pixel. FIG. 12C shows a 8-neighbor method for searching for eight neighboring pixels, that is, upward, downward, leftward, rightward, and four diagonal directions with respect to a current pixel.

Figure 12D:
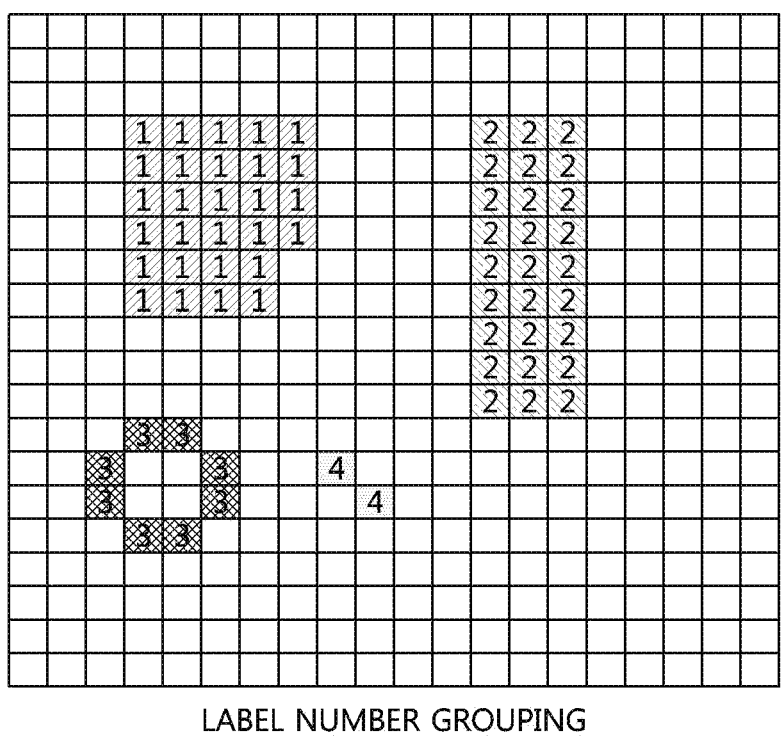

FIG. 12D shows an example in which pixels are grouped by assigning the same label number to adjacent regions. Referring to FIG. 12D, for example, it can be confirmed that diagonal pixels having a label number of "4" are grouped.

The grouping of the adjacent regions in such a manner is referred to as labeling. In the present invention, the labeling is used for obtaining positions of all regions of the barcode.

Figure 13:
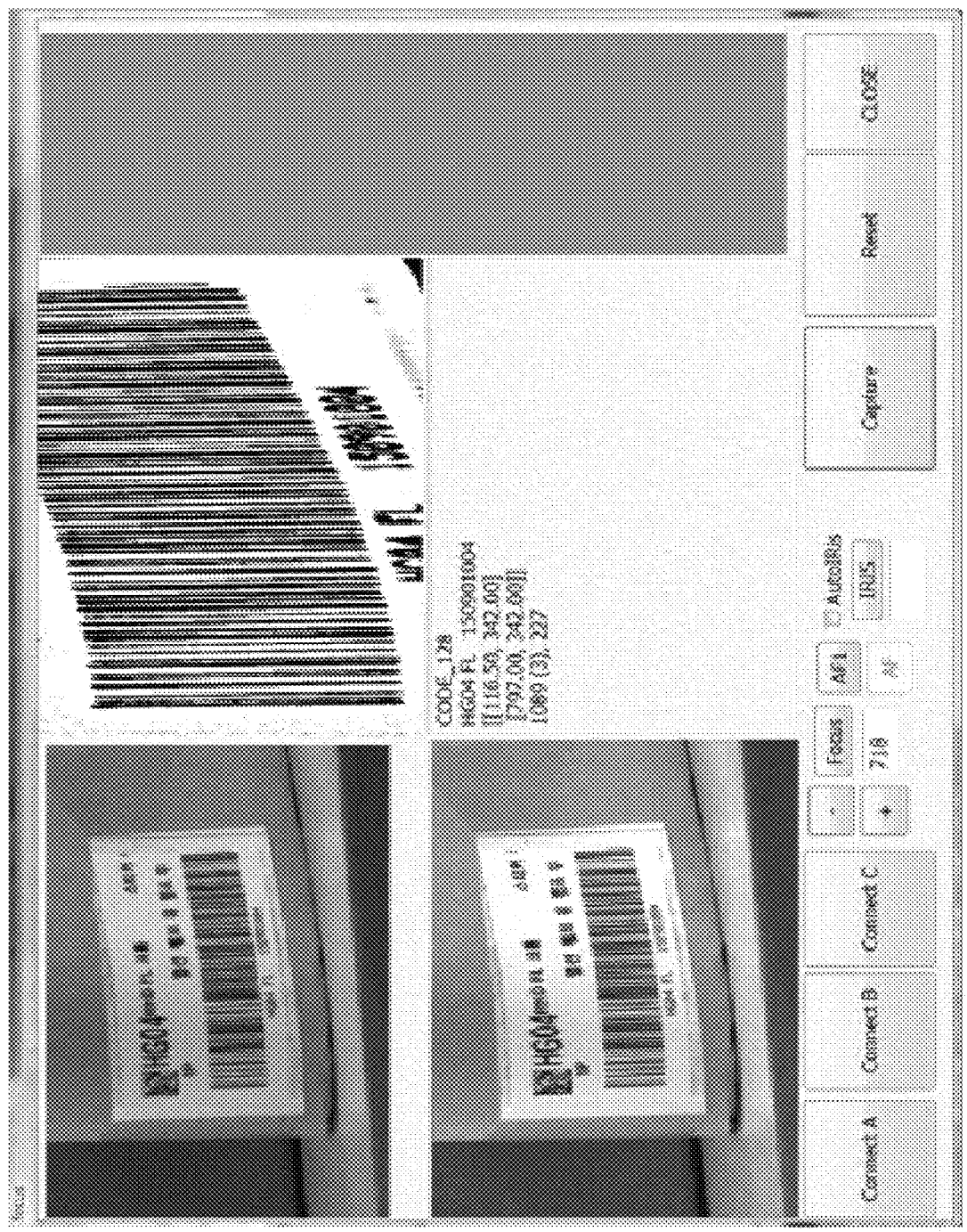
FIG. 13 is a view showing an example of a screen provided by a user interface according to an embodiment of the present invention.

FIG. 13 is a view showing an example of a screen provided by a user interface according to an embodiment of the present invention.

Referring to FIG. 13, the user interface according to the present invention outputs an image obtained in real time and outputs and provides a snapshot image taken at a finally determined focus, an image obtained by performing preprocessing after snap shooting, and a result value obtained by extracting and recognizing the barcode to a user. The user may manually perform zooming-in or zooming-out, focus movement, and brightness adjustment through the user interface. The user interface may also provide buttons for manually capturing, resetting, and ending through a screen.

When all of the capturing, recognition, and outputting of the barcode image is completed and the corresponding product is then transferred and exits, an infrared sensor recognizes the product and transmits a message, "AGV OUT," to the barcode recognition apparatus according to the present invention, and the barcode recognition apparatus, which receives the corresponding message and recognizes the exit of the product, stops all capturing for the product and waits until a following product enters.

Figure 14:
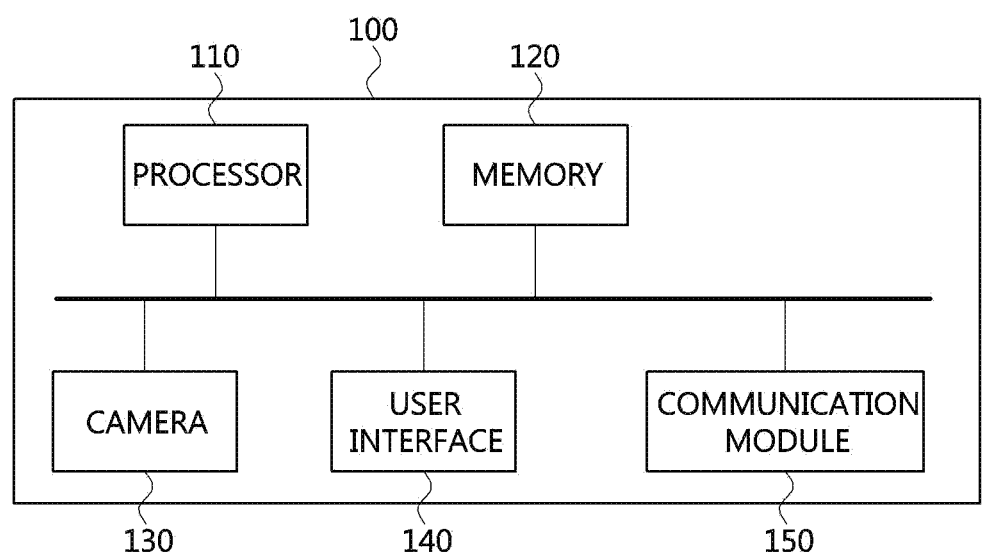
FIG. 14 is a block diagram showing a barcode recognition apparatus according to an embodiment of the present invention.

FIG. 14 is a block diagram showing a barcode recognition apparatus according to an embodiment of the present invention.

The barcode recognition apparatus according to the embodiment of the present invention may include a processor 110, a memory 120, a camera 130, a user interface 140, and a communication module 150.

Meanwhile, the infrared sensor or the IIoT sensor module described above may be implemented as a separate apparatus from the barcode recognition apparatus to communicate with the barcode recognition apparatus, or may be integrated into the barcode recognition apparatus and implemented in the form of a system.

The memory 120 may be configured to store at least one instruction executed by the processor and store a result of the instruction execution.

Here, the at least one instruction may include an instruction for causing the processor to receive a triggering message, which indicates that a product enters, from a sensor, an instruction for causing the processor to set a camera focus on the basis of a barcode in an image of the product obtained using the camera upon receiving the triggering message, an instruction for causing the processor to obtain a product image according to the set camera focus, an instruction for causing the processor to perform preprocessing for extracting a barcode region on the product image, an instruction for causing the processor to extract the barcode region from the preprocessed image, and an instruction for causing the processor to derive barcode information from the extracted barcode region.

The instruction for causing the processor to set the camera focus on the basis of the barcode in the image of the product obtained using the camera may include an instruction for causing the processor to extract an edge of the barcode with respect to a plurality of focuses at regular intervals within a search range which is set based on an initial focus and calculate a sum of values of pixels constituting the extracted edge, and an instruction for causing the processor to set a focus, at which the calculated sum of the pixel values of the edge is maximum, as the camera focus for obtaining a barcode image.

The instruction for causing the processor to set the camera focus on the basis of the barcode in the image of the product obtained using the camera may include an instruction for causing the processor to compare the calculated sum of the pixel values of the edge with respect to a plurality of camera focuses, and an instruction for causing the processor to set a focus, at which the sum of the pixel values of the edge is maximum, as the camera focus for obtaining the barcode image.

The instruction for causing the processor to compare the calculated sum of the pixel values of the edge with respect to the plurality of camera focuses may include an instruction for causing the processor to set the search range on the basis of the initial focus, and an instruction for causing the processor to extract the edge of the barcode within the search range while decreasing or increasing a focus value to have a predetermined interval from an upper limit or a lower limit of the search range.

In this case, the instruction for causing the processor to extract the edge of the barcode within the search range while decreasing or increasing the focus value to have the predetermined interval from the upper limit or the lower limit of the search range may include an instruction for causing the processor to calculate a sum of the pixel values of the edge at a first focus, an instruction for causing the processor to calculate a sum of the pixel values of the edge at a second focus, that is, at a time point following a time point at which the first focus is set, and an instruction for causing the processor to stop additional extraction of the edge of the barcode at a next focus and set the first focus as the camera focus for obtaining the barcode image when the sum of the pixel values of the edge calculated at the first focus is greater than or equal to the sum of the pixel values of the edge calculated at the second focus.

The instruction for causing the processor to perform the preprocessing for extracting the barcode region on the product image may include an instruction for causing the processor to perform image enhancement on the product image, and an instruction for causing the processor to extract the barcode region from the enhanced product image.

The instruction for causing the processor to perform the image enhancement on the product image may include an instruction for causing the processor to perform a sharpening operation by subtracting a blurred image from the product image, an instruction for causing the processor to calculate a product of pixel values of the sharpened image, and an instruction for causing the processor to remove noise generated due to the sharpening operation.

The instruction for causing the processor to extract the barcode region may include an instruction for causing the processor to extract a histogram of the input image, an instruction for causing the processor to perform binarization on the image using the histogram of the image and an adaptive threshold, and an instruction causing the processor to perform a labeling operation on the binarized image.

The instruction for causing the processor to perform the binarization on the image may include an instruction for causing the processor to divide the image into a plurality of sub-regions, an instruction for causing the processor to assign a threshold for each of the sub-regions according to brightness of a corresponding sub-region, and an instruction for causing the processor to perform binarization for each of the sub-regions according to the corresponding threshold.

Here, each of the pixel values may be a value indicating a luminance of a corresponding pixel.

The camera 130 obtains an image of the entering product to transmit the image to the processor 110, and obtains the image of the product including the barcode according to the focus set by the processor 110. In the present invention, a method of setting a focus at a high speed is applied to the camera so that the barcode is recognized at a sufficient speed even with a single camera. Therefore, in the present invention, one camera is sufficient, but it does not preclude the possibility that a plurality of cameras are used.

The user interface 140 outputs the image obtained in real time and outputs and provides a snapshot image taken at a finally determined focus, an image obtained by performing preprocessing after snap shooting, and a result value obtained by extracting and recognizing the barcode to a user. The user interface 140 also provides buttons for zooming-in or zooming-out, focus movement, and brightness adjustment to the user, and transmits a command input from the user to the processor 110.

The communication module 150 transmits the recognized barcode information to the outside in the form of a packet or the like. Information about a destination to which the barcode information is to be transmitted may be easily changed by modifying a configuration file by the user through the user interface or the like. The configuration file may include an Internet Protocol address (IP address) and a port number of the destination to which the barcode information is to be transmitted. The barcode information may be transmitted to an external server or the like which provides a barcode application service.

In a production system using an existing hand-held barcode reader, the operator's fatigue and complexity are increased so that an environment that can cause defects is provided. On the other hand, in the present invention, a remote barcode recognition system is applied instead of an existing hand-held barcode technique so that it is possible to improve a recognition speed and the accuracy of operation and increase the convenience of the operator.

Further, by using the above-described embodiments of the present invention, the barcode may be automatically recognized using the image of the product during the transfer of the product or at the time of work without interrupting the movement of the operator so that information related to the product may be provided to the operator.

The operations of the method of the embodiment of the present invention may be implemented as computer readable programs or codes in a computer readable recording medium. The computer readable recording medium includes any type of recording devices in which data readable by a computer system is stored. In addition, the computer readable recording medium may be distributed to a computer system connected via a network, and a code readable by a computer is stored and executed in a distributed manner.

Further, the computer readable recording media may include a hardware device, such as a read only memory (ROM), a random access memory (RAM), or a flash memory, that is specially made to store and execute the program instruction. The program instruction may include a machine code generated by a compiler and a high-level language code that may be executed in a computer using an interpreter.

While some aspects of the present invention have been described in the context of the apparatus, it may also represent the description according to a corresponding method, wherein the block or apparatus corresponds to the operation of the method and a feature of the operation of the method. Similarly, the aspects described in the context of the method may also be represented by features of the corresponding block, item, or apparatus. Some or all of the operations of the method may be performed by (or using), for example, a microprocessor, a programmable computer, or a hardware apparatus such as an electronic circuit. In some embodiments, one or more of the most important method operations may be performed by such an apparatus.

In the embodiments, a programmable logic device (e.g., a field programmable gate array) may be used for performing some or all of the functions of the methods. In the embodiments, the field programmable gate array may operate together with the microprocessor for performing one of the methods described herein. Generally, the methods may be performed by any hardware apparatus.

According to the embodiments of the present invention as described above, a barcode recognition speed can be significantly improved and productivity may also be improved.

Accordingly, in the present invention, the operator's fatigue and the complexity of the operation can be reduced as compared to a production system using an existing hand-held barcode reader.

Further, a barcode can be recognized at a wide angle in lateral and vertical directions. The barcode can be efficiently recognized and the high recognition performance of the barcode can be provided when a distance between a product and a camera is about 2 meters, which is a distance at which the productivity of the work can be secured on a production line.

Further, it is possible to prevent erroneous specification or erroneous assembly that frequently occurs due to the use of the existing hand-held barcode reader.

While the present invention has been described with reference to the exemplary embodiments, it will be understood by those skilled in the art that various changes and modifications may be made without departing from the spirit and scope of the present invention as defined by the appended claims.

What is claimed is:

1. A barcode recognition method comprising:
   receiving, from a sensor, a triggering message indicating that a product enters a product detection area;
   setting a camera focus on the basis of a barcode in an image of the product obtained using a camera upon receiving the triggering message;
   obtaining a product image according to the set camera focus;
   performing preprocessing for extracting a barcode region on the product image;
   extracting the barcode region from the preprocessed image; and
   deriving barcode information from the extracted barcode region,
   wherein the setting of the camera focus on the basis of the barcode in the image of the product obtained using the camera includes:
   comparing sums of values of pixels of edges of the barcode calculated with respect to a plurality of camera focuses; and
   setting one of the plurality of focuses, at which the sum of the values of the pixels of the edge of the barcode is maximum among the calculated sums with respect to the plurality of focuses, as the camera focus for obtaining a barcode image,
   wherein the comparing of the sums of the values of the pixels of the edges of the barcode calculated with respect to the plurality of camera focuses includes:
   setting a search range on the basis of an initial focus; and
   extracting the edges of the barcode with respect to the plurality of camera focuses within the search range while keeping decreasing or increasing a value of the initial focus by a predetermined interval from an upper limit or a lower limit of the search range.

2. The barcode recognition method of claim 1, wherein the extracting of the edges of the barcode with respect to the plurality of camera focuses within the search range while keeping decreasing or increasing the value of the focus by the predetermined interval from the upper limit or the lower limit of the search range includes:
   calculating a sum of the values of the pixels of the edge at a first focus;
   calculating a sum of the values of the pixels of the edge at a second focus which is set at a time point following the point at which the first focus is set; and
   stopping additional extraction of the edge of the barcode at a next focus and setting the first focus as the camera focus for obtaining the barcode image, when the sum of the pixel values of the edge calculated at the first focus is greater than or equal to the sum of the pixel values of the edge calculated at the second focus.

3. The barcode recognition method of claim 1, wherein the performing of the preprocessing for extracting the barcode region on the product image includes:
   performing image enhancement on the product image; and
   extracting the barcode region from the enhanced product image.

4. The barcode recognition method of claim 3, wherein the performing of the image enhancement on the product image includes:
   performing a sharpening operation by subtracting a blurred image from the product image;
   calculating a product of pixel values of the sharpened image; and
   removing noise generated due to the sharpening operation.

5. The barcode recognition method of claim 1, wherein the extracting of the barcode region includes:
   extracting a histogram of the image that is input;
   performing binarization on the image using the histogram of the image and an adaptive threshold; and
   performing a labeling operation on the binarized image.

6. The barcode recognition method of claim 5, wherein the performing of the binarization on the image includes:
   dividing the image into a plurality of sub-regions;
   assigning a threshold for each of the sub-regions according to brightness of a corresponding sub-region; and
   performing binarization for each of the sub-regions according to the corresponding threshold.

7. The barcode recognition method of claim 1, wherein each of the values of the pixels is a value indicating a luminance of a corresponding pixel.

8. A barcode recognition apparatus comprising:
   a camera configured to obtain an image of a product entering a product detection area;
   a processor; and
   a memory configured to store at least one instruction executed by the processor,
   wherein the at least one instruction includes:
   an instruction configured to receive a triggering message, which indicates that the product enters the product detection area, from a sensor;
   an instruction configured to set a camera focus on the basis of a barcode in an image of the product obtained using the camera upon receiving the triggering message;
   an instruction configured to obtain a product image according to the set camera focus;
   an instruction configured to perform preprocessing for extracting a barcode region on the product image;
   an instruction configured to extract the barcode region from the preprocessed image; and
   an instruction configured to derive barcode information from the extracted barcode region,
   wherein the instruction configured to set the camera focus on the basis of the barcode in the image of the product obtained using the camera includes:

an instruction configured to compare sums of the pixel values of the edges of the barcode calculated with respect to a plurality of camera focuses; and an instruction configured to set one of the plurality of focuses, at which the sum of the pixel values of the edge of the barcode is maximum among the calculated sums with respect to the plurality of focuses, as the camera focus for obtaining the barcode image, wherein the instruction configured to compare the sums of the pixel values of the edges of the barcode calculated with respect to the plurality of camera focuses includes:

an instruction configured to set a search range on the basis of an initial focus; and an instruction configured to extract the edges of the barcode with respect to the plurality of camera focuses within the search range while keeping decreasing or increasing a focus value by a predetermined interval from an upper limit or a lower limit of the search range.

9. The barcode recognition apparatus of claim 8, wherein the instruction configured to extract the edges of the barcode with respect to the plurality of camera focuses within the search range while keeping decreasing or increasing the focus value by the predetermined interval from the upper limit or the lower limit of the search range includes:

an instruction configured to calculate a sum of the pixel values of the edge at a first focus;

an instruction configured to calculate a sum of the pixel values of the edge at a second focus which is set at a time point following the point at which the first focus is set; and an instruction configured to stop additional extraction of the edge of the barcode at a next focus and set the first focus as the camera focus for obtaining the barcode image, when the sum of the pixel values of the edge calculated at the first focus is greater than or equal to the sum of the pixel values of the edge calculated at the second focus.

10. The barcode recognition apparatus of claim 8, wherein the instruction configured to perform the preprocessing for extracting the barcode region on the product image includes:

an instruction configured to perform image enhancement on the product image; and an instruction configured to extract the barcode region from the enhanced product image.

11. The barcode recognition apparatus of claim 10, wherein the instruction configured to perform the image enhancement on the product image includes:

an instruction configured to perform a sharpening operation by subtracting a blurred image from the product image;

an instruction configured to calculate a product of pixel values of the sharpened image; and an instruction configured to remove noise generated due to the sharpening operation.

12. The barcode recognition apparatus of claim 8, wherein the instruction configured to extract the barcode region includes:

an instruction configured to extract a histogram of the image that is input;

an instruction configured to perform binarization on the image using the histogram of the image and an adaptive threshold; and an instruction configured to perform a labeling operation on the binarized image.

13. The barcode recognition apparatus of claim 12, wherein the instruction configured to perform the binarization on the image includes:

an instruction configured to divide the image into a plurality of sub-regions;

an instruction configured to assign a threshold for each of the sub-regions according to brightness of a corresponding sub-region; and an instruction configured to perform binarization for each of the sub-regions according to the corresponding threshold.

14. The barcode recognition apparatus of claim 8, wherein each of the pixel values is a value indicating a luminance of a corresponding pixel.

* * * * *